Patented Oct. 4, 1932

1,880,420

UNITED STATES PATENT OFFICE

HANS T. CLARKE, OF NEW YORK, AND CARL J. MALM, OF ROCHESTER, NEW YORK, ASSIGNORS TO EASTMAN KODAK COMPANY, OF ROCHESTER, NEW YORK, A CORPORATION OF NEW YORK

ACETONE SOLUBLE FORMYL ESTERS OF CELLULOSE AND PROCESS OF MAKING THE SAME

No Drawing. Application filed March 9, 1929, Serial No. 345,883, and in Great Britain and Germany March 27, 1928.

This invention relates to acetone-soluble formyl esters of cellulose. It relates to such esters whether the acyl groups are all formyl, or part of the acyl groups are formyl and the remainder other higher groups. It further relates to processes of making such esters. One object of the invention is to provide formyl esters of cellulose which will be wholly soluble in acetone. Another object is to provide relatively simple and easily controlled processes for making such esters. Other objects will hereinafter appear.

So far as we are aware, the formyl celluloses hitherto prepared have been soluble only in strong organic acids, such as formic acid, lactic acid, etc., or strong organic bases, such as pyridine or mixtures of certain types of inorganic salts. These have serious disadvantages which have rendered undesirable the commercial use of them. The acids are extremely corrosive and are, therefore, injurious in film and filament making machinery. Pyridine has an intense odor, which it is exceedingly difficult to eliminate from any ester composition in which it has once been present. The inorganic salts are either not strong solvents, or are especialy objectionable in the manufacture of transparent articles, such as films, from the esters. When films are deposited from any of these types of solvents, large amounts of the solvents are trapped in the films. They are extremely difficult to remove entirely from the film by washing on any commercial scale, and their nature is such that the continued presence of them in the films tends to impair the latter.

It is, therefore, highly desirable to prepare formyl celluloses which do not necessitate the use of the solvents named above, but permit the employment of the best kind of volatile organic solvents which have been successfully used with other organic esters of cellulose. Acetone is the more prominent of such suitable solvents; and we have succeeded in preparing formyl celluloses which are wholly soluble in it.

The novel acetone-soluble formyl celluloses which we have prepared contain seven or more formyl groups for each 24 carbon atoms in the cellulose. In fact, we prefer to have our esters contain over 25% of formyl groups. While polyformyl celluloses have been mentioned in the prior literature, they were not soluble in any of the commercial volatile neutral solvents; and it is possible that their analysis indicated a higher formyl content than was actually present. (See The Interaction of Formic Acid and Cellulose, Cross and Bevan, Chemical Society Journal, London, 1911, vol. 99, page 1450, which states that saponification of a monoformate may yield two molecules of formic acid through decomposition.)

By the aid of powerful organic anhydrids (not previously used for that purpose) which strongly impel the esterification of cellulose by formic acid, have we been able to prepare esters containing more than seven formyl groups for each 24 carbon atoms in the cellulose. With the aid of such anhydrids we have been able to make esters containing even more than eight formyl groups for each 24 carbon atoms in the cellulose. Moreover, we have been able to prepare formyl celluloses containing also acyl groups selected from the higher fatty acids of more than two carbon atoms, these mixed esters being also soluble in practical solvents.

While it is well known that hydrocellulose, and other degraded forms of cellulose, such as that derived from solutions of cellulose in sulfuric acid, are more easily esterified than unhydrolized or undegraded cellulose, the esters derived from such hydrocellulose or degraded cellulose have generally yielded films which possess unsatisfactory qualities. It is a feature of our process that we can prepare our acetone-soluble celluloses directly from substantially unhydrolyzed or undegraded cellulose, such as the forms of cellulose used in the making of high-grade cellulose acetates. For example, we prefer to use cotton, with the ordinary purification and bleaching, cotton tissue paper, and even carefully purified wood pulp, such as high-grade sulfite wood pulp which has been bleached.

We shall now give several examples of our invention, but it will be understood that the latter is not confined to the details described, except as set forth in the appended claims.

A mixture of 20 parts by weight of formic acid (85%) and 40 parts by weight of chloracetic anhydrid is warmed, say at 50° C., for about one hour and then cooled down, say to about 30° C. Into this mixture 5 parts by weight of cellulose, such as purified cotton fibers, are added and the mixture kept at about 35 to 40° C. until a sample shows that the ester has become soluble in acetone. This often takes place in about 96 hours. While the cotton fibers may disappear in a much shorter time, (even in 24 hours) it is essential to prolong the esterification for a considerable time after a clear reaction dope is formed. The reaction mixture may be poured with stirring into water, or any other suitable non-solvent precipitating bath. After washing and drying, the precipitate is a white product, soluble in acetone and insoluble in chloroform and benzol. An ester, thus formed, upon careful analysis, has been found to contain between seven and eight combined firmly bound formyl groups for each 24 carbon atoms in the cellulose, say 25.5% of formyl groups in the ester. If the material be left in water at room temperature for several days, no appreciable acidity develops.

We have found that the number of formyl groups may be increased by reinforcing the esterification bath at intervals by adding further amounts of fresh reagents. For example, a bath is prepared exactly as in the example hereinabove given. 5 parts by weight of cellulose, such as purified cotton, are stirred into the mass and the latter kept at 35 to 40° C. for 48 hours, which is well after the time when the mass becomes homogeneous by the disappearance of the cotton fibers. The product at this stage is insoluble in acetone and contains 19% of formyl. At the end of said 48 hours, there is added to the reaction mass a mixture of 10 parts by weight of formic acid and 20 parts by weight of chloracetic acid and the temperature maintained between 35 and 40° C. for 48 additional hours. The product is precipitated and purified in the same way as in the previous example. It is wholly soluble in acetone and substantially insoluble in chloroform. It contains nearly 28% of formyl groups, and has, therefore, more than two formyl groups for each six carbon atoms in the cellulose (or more than 8 formyl groups for each 24 carbon atoms in the cellulose, if that be the preferred basis of computation).

Mixed esters containing the formyl groups may be prepared by esterifying the products of the above examples with higher fatty acids containing more than one carbon atom, such as acetic, propionic, butyric, caproic, lauric, myristic, palmitic and stearic. Even with the most difficult members of the series, the production of such mixed esters can be effected. For example, a reaction mixture is prepared containing 15 parts by weight of stearic acid, 20 parts by weight of chloracetic anhydrid, 20 parts by weight of monochloracetic acid, and .5 parts by weight of magnesium perchlorate as a catalyst. Into this bath are stirred 4.5 parts by weight of the formyl cellulose produced in the second example given above,—namely, the one containing more than two formyl groups per six carbon atoms in the cellulose. The reaction is conducted for about 72 hours at 60 to 65° C., at which time a clear or homogeneous dope is obtained, although it is permissible for it to have a somewhat grainy appearance, in spite of its transparency. The reaction mixture is precipitated by means of warm methyl alcohol, and the product washed with warm methyl alcohol and then dried. It is soluble in acetone, chloroform or benzol. It is insoluble in ligroin, ether or carbon tetrachlorid.

All of the formyl celluloses hereinabove described deposit transparent films upon evaporation of their solutions in the volatile solvents listed above. It will be obvious that they may be mixed with other cellulose esters, soluble in the same solvents, into plastic, film or filament-forming compositions; and layers of them may be combined with layers of other cellulose esters in laminated films or varnishes or other products, a common solvent being present to promote the union, in accordance with customary practice. For instance, the acetone-soluble formyl esters may be mixed with acetone-soluble cellulose acetates. Moreover, layers of our formyl celluloses may be united with layers of acetone-soluble cellulose acetate by means of a cement containing acetone; or a layer of one of these may be varnished or flowed over a layer of the other so as to adhere to it. Plastifiers or softeners, such as those hitherto used with acetone-soluble cellulose acetates may be combined with our acetone-soluble formyl esters in acetone solutions and can be employed in about their customary proportions. Tricresyl and triphenyl phosphates, monochlornaphthalene and diacetin are a few of the many examples which could be given.

In place of the monochloracetic anhydrid in the above examples, we may use the di or trichloracetic anhydrids. In fact we may use any of the substituted fatty acid anhydrids named in our copending application, process of making cellulose esters of organic acids, filed March 28, 1927, Serial No. 179,177. The mono, di and tribromacetic anhydrids, or mixtures of them, may be employed. Also it is possible to use mono di and trichlor and brom propionic and butyric anhydrids, as well as the methoxy, acetic, propionic and butyric anhydrids. But there is nothing to be gained from the higher members of this group, since chloracetic anhydrid is the most active and least expensive.

Having thus described our invention, what we claim as new and desire to secure by Letters Patent is:

1. A mixed organic ester of cellulose wholly soluble in acetone containing, for every 24 carbon atoms in the cellulose, more than seven formyl groups and at least one acyl group selected from the group which consists of the fatty acids containing more than one carbon atom.

2. A mixed ester of cellulose which is wholly soluble in acetone containing, for every 24 carbon atoms in the cellulose, at least eight formyl groups and at least one acyl group selected from the higher solid fatty acids.

3. An acetone-soluble ester of cellulose prepared by direct esterification of substantially unhydrolyzed cellulose, said ester containing more than seven formyl groups for each 24 carbon atoms in the cellulose.

4. An acetone-soluble cellulose formate directly prepared from substantially undegraded cellulose.

5. In the process of making formyl celluloses, treating cellulosic material to the coaction of formic acid and a halogen or alkoxy substituted fatty acid anhydrid which impels esterification without itself contributing acyl groups to the ester, the acid corresponding to said anhydrid containing less than five carbon atoms, said treatment being continued until an acetone-soluble formyl cellulose is produced.

6. In the process of making formyl celluloses, treating cellulosic material to the coaction of formic acid and a chlor acetic anhydrid, said treatment being continued until an acetone-soluble formyl cellulose is produced containing more than seven formyl groups for each 24 carbon atoms in the cellulose.

7. In the process of making formyl celluloses, treating cellulose fibers to the coaction of formic acid and a halogen or alkoxy substituted fatty acid anhydrid which impels esterification without itself contributing acyl groups to the ester, the acid corresponding to said anhydrid containing less than five carbon atoms, said treatment being continued until the cellulose fibers disappear and a homogeneous reaction mixture is obtained, and the reaction being thereafter continued until an acetone-soluble formyl cellulose is produced.

8. In the process of making formyl celluloses, treating cellulosic fibers to the coaction of formic acid and a chlor acetic anhydrid until the point when the fibers disappear and a homogeneous reaction mixture results, and then carrying on the treatment until the total time is more than twice the time at which said point was reached.

9. The process of making formyl celluloses which comprises treating cellulosic material to the coaction of formic acid and a halogen or alkoxy substituted fatty acid anhydrid which impels esterification without itself contributing acyl groups to the ester, the acid corresponding to said anhydrid containing less than five carbon atoms, said treatment being continued until a clear reaction mixture results, adding fresh portions of formic acid and said anhydrid to the reaction mixture, and containing the treatment until an acetone-soluble formyl cellulose is produced containing at least eight formyl groups for each 24 carbon atoms in the cellulose.

10. In the process of making formyl celluloses, treating cellulosic fibers to the coaction of formic acid and chloracetic anhydrid at temperatures between 35 to 40° C. until said fibers disappear and a clear reaction mixture results, and continuing said reaction at said temperatures until an acetone-soluble formyl cellulose is produced containing more than seven formyl groups for each 24 carbon atoms in the cellulose.

Signed at Rochester, New York, this 5 day of March 1929.

HANS T. CLARKE.
CARL J. MALM.